US012570108B2

(12) United States Patent
Nonaka

(10) Patent No.: US 12,570,108 B2
(45) Date of Patent: Mar. 10, 2026

(54) MOTORCYCLE TIRE FOR RUNNING ON ROUGH TERRAIN

(71) Applicant: Sumitomo Rubber Industries, Ltd., Kobe (JP)

(72) Inventor: Kenji Nonaka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/226,282

(22) Filed: Jul. 26, 2023

(65) Prior Publication Data

US 2024/0034097 A1 Feb. 1, 2024

(30) Foreign Application Priority Data

Aug. 1, 2022 (JP) ................................. 2022-122756

(51) Int. Cl.
*B60C 11/11* (2006.01)

(52) U.S. Cl.
CPC .......... *B60C 11/11* (2013.01); *B60C 2200/10* (2013.01); *B60C 2200/14* (2013.01)

(58) Field of Classification Search
CPC ... B60C 11/11; B60C 11/032; B60C 11/1376; B60C 2200/10; B60C 2200/14
See application file for complete search history.

(56) References Cited

U.S. PATENT DOCUMENTS

| | | | |
|---|---|---|---|
| 8,631,845 B2 | 1/2014 | Ishida | |
| 2012/0024440 A1* | 2/2012 | Ishida | B60C 11/11 152/209.1 |
| 2018/0178588 A1 | 6/2018 | Sueishi | |
| 2019/0184758 A1 | 6/2019 | Sueishi | |
| 2020/0023687 A1 | 1/2020 | Miwa | |
| 2020/0207156 A1 | 7/2020 | Miwa | |

FOREIGN PATENT DOCUMENTS

| | | | |
|---|---|---|---|
| JP | 2019-108037 A | 7/2019 | |
| WO | WO-2019151505 A1 * | 8/2019 | B60C 11/11 |

OTHER PUBLICATIONS

Matsuda, English Machine Translation of WO 2019151505, 2019 (Year: 2019).*
Extended European Search Report issued Dec. 5, 2023 in European Patent Application No. 23186775.5, 9 pages.

* cited by examiner

*Primary Examiner* — Katelyn W Smith
*Assistant Examiner* — Brendon Charles Darby
(74) *Attorney, Agent, or Firm* — XSENSUS LLP

(57) ABSTRACT

A motorcycle tire for running on rough terrain includes a tread portion. The tread portion can include a tire equator, a first tread end, and first blocks. Each of the first blocks can include a tread surface and an outer side wall. The tread surface can include an outer edge. The outer edge can include a protrusion, a first portion, and a second portion. The first portion and the second portion can form a minor angle therebetween on the first tread end side.

23 Claims, 5 Drawing Sheets

MOTORCYCLE TIRE FOR RUNNING ON ROUGH TERRAIN

CROSS-REFERENCE TO RELATED APPLICATION(S)

The present application claims priority to Japanese patent application JP 2022-122756, filed on Aug. 1, 2022, the entire contents of which is incorporated herein by reference in its entirety.

BACKGROUND

Field

The present disclosure relates to a motorcycle tire for running on rough terrain.

Background Art

In Japanese Laid-Open Patent Publication No. 2019-108037, a motorcycle tire for running on rough terrain is proposed, and the motorcycle tire includes a tread portion having a block pattern provided with a plurality of blocks. At least one of the blocks of the tire includes a pair of lateral narrow groove portions extending in a tire axial direction on a tread surface that has a pair of lateral edges extending in the tire axial direction, and a pair of edge-side pieces each defined between the lateral edge and the lateral narrow groove portion. At least one of the pair of edge-side pieces has a narrow width portion having the minimum length in a tire circumferential direction, and has a length in the tire circumferential direction increasing from the narrow width portion toward both sides in the tire axial direction.

In the above-described tire, there is room for improvement in rolling characteristics (e.g., characteristics including lightness during rolling and response during rolling) when a vehicle is leaned during cornering.

SUMMARY

One or more embodiments of the present disclosure are directed to a motorcycle tire for running on rough terrain, the motorcycle tire including a tread portion, wherein the tread portion includes a tire equator, a first tread end, and a plurality of first blocks disposed on the first tread end side with respect to the tire equator, where each of the plurality of first blocks can include a tread surface facing outward in a tire radial direction and an outer side wall on the first tread end side, the tread surface can include an outer edge between the tread surface and the outer side wall, the outer edge can include a protrusion protruding locally on the first tread end side, a first portion located on one side in a tire circumferential direction of the protrusion, and a second portion located on another side in the tire circumferential direction of the protrusion, and where the first portion and the second portion can be disposed so as to form a minor angle therebetween on the first tread end side.

DETAILED DESCRIPTION

Embodiments of the present disclosure have been made in view of the circumstances in the Background section, and an object of one or more embodiments of the present disclosure, among one or more objects, can be to provide a motorcycle tire for running on rough terrain capable of achieving excellent rolling characteristics.

As a result of adopting configurations according to embodiments of the present disclosure, the motorcycle tire for running on rough terrain can achieve excellent rolling characteristics.

Figure 1:
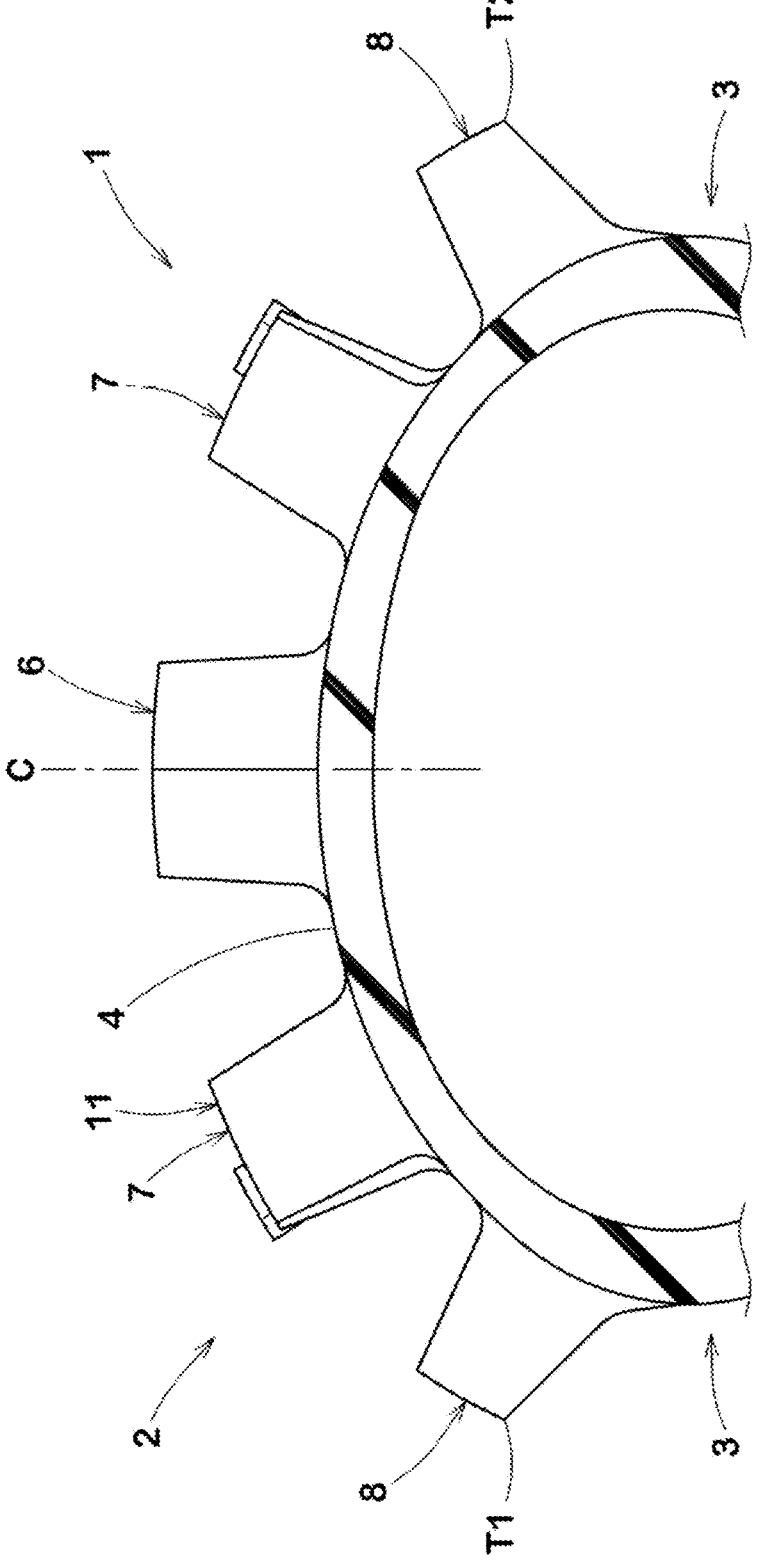
FIG. 1 is a cross-sectional view of a tread portion of a motorcycle tire for running on rough terrain according to one or more embodiments of the present disclosure.
Figure 2:
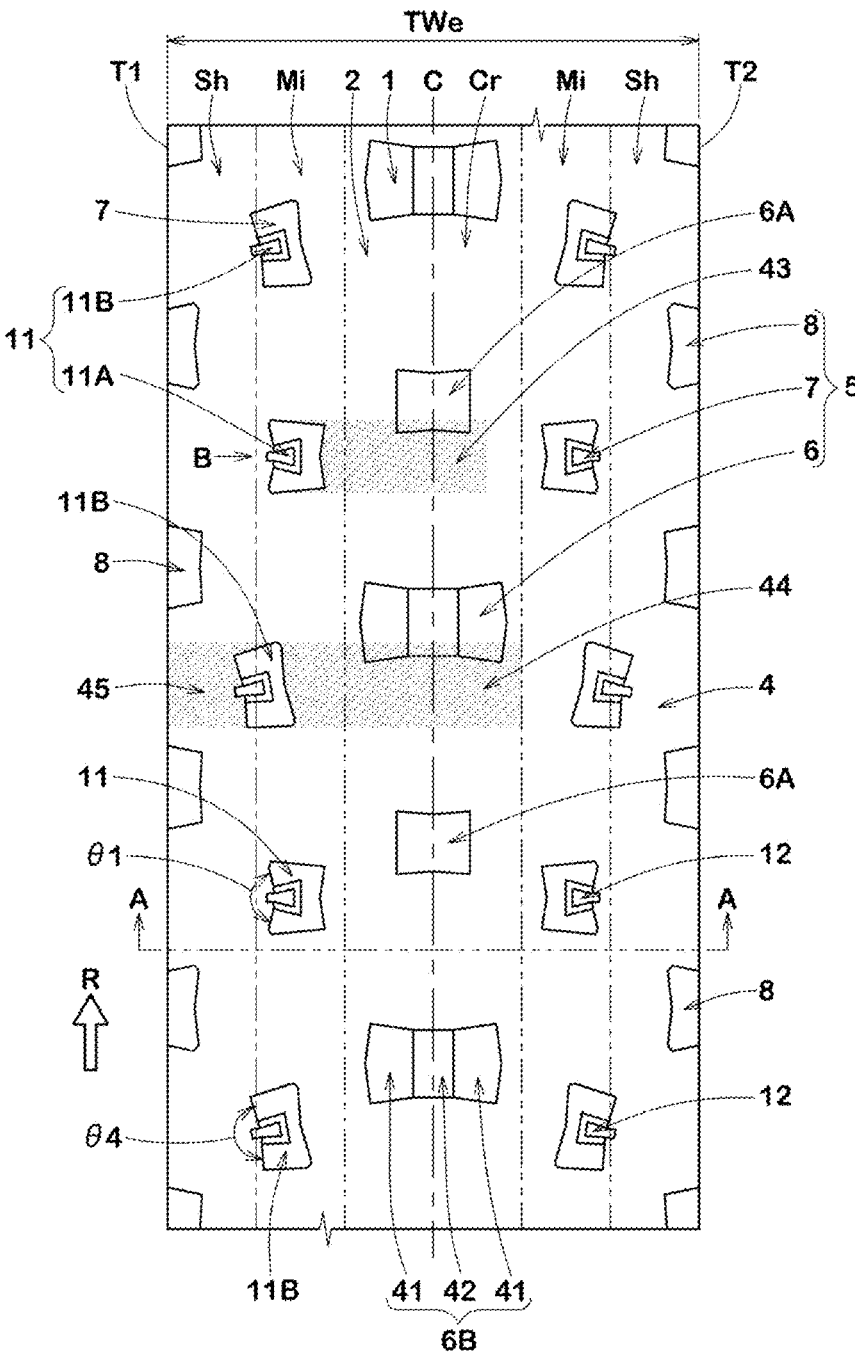
FIG. 2 is a development of the tread portion in FIG. 1.

Hereinafter, one or more embodiments of the present disclosure will be described with reference to the drawings. FIG. 1 is a cross-sectional view of a tread portion 2 of a motorcycle tire (hereinafter, also referred to simply as "tire") 1 for running on rough terrain according to one or more embodiments of the present disclosure in a standardized state. FIG. 2 is a development of the tread portion 2 of the tire 1 laid out to be flat. FIG. 1 corresponds to a cross-sectional view taken along a line A-A in FIG. 2.

The "standardized state" can be regarded as a state in which a tire is fitted on a standardized rim and is inflated to a standardized internal pressure and no load is applied to the tire when the tire is a tire for which various standards are defined. For tires for which various standards are not defined, the standardized state can be regarded as a standard use state, corresponding to a purpose of use of the tire, in which no load is applied to the tire. In the present application, unless otherwise specified, the dimensions of the components and the like are represented by values measured in the standardized state.

The "standardized rim" can be regarded as a rim that is defined by a standard for each tire, in a standard system including the standard on which the tire is based, and can be, for example, "standard rim" in the JATMA standard, "Design Rim" in the TRA standard, or "Measuring Rim" in the ETRTO standard, as examples.

The "standardized internal pressure" can be regarded as an air pressure that is defined by a standard for each tire, in a standard system including the standard on which the tire is based, and can be "maximum air pressure" in the JATMA standard, the maximum value recited in the table "TIRE LOAD LIMITS AT VARIOUS COLD INFLATION PRESSURES" in the TRA standard, or "INFLATION PRESSURE" in the ETRTO standard, as examples.

The tire 1 as shown in FIG. 1 may be used as a tire for motocross racing, for example. The tire 1 may be used as a tire for the rear wheel of a motocross vehicle, for example. However, embodiments of the present disclosure are not limited thereto. In the tire 1, the tread portion 2 can have an outer surface curved in an arc shape that is convex outward in a tire radial direction, on a transverse cross-section thereof.

The tire 1, for example, can include a carcass and a tread reinforcing layer.

As shown in FIG. 2, the tread portion 2 of the tire 1 can include a directional pattern having a designated rotation direction R. The rotation direction R is indicated, for example, on each sidewall portion 3 (shown in FIG. 1) by characters or symbols. However, embodiments of the present disclosure are not limited thereto.

The tread portion 2 can be, for example, divided into a crown region Cr, a middle regions Mi, and a shoulder regions Sh.

The crown region Cr can be regarded as a region centered at a tire equator C and having a width, for instance, that is ⅓ of a tread development width TWe. Each shoulder region Sh can be regarded as a region having a width, for instance, that is ⅙ of the tread development width TWe and extending from a first tread end T1 or a second tread end T2 toward the tire equator C side. Each middle region Mi can be regarded as a region between the crown region Cr and the shoulder region Sh.

The tread development width TWe can be regarded as a distance from the first tread end T1 to the second tread end T2 in a tire axial direction when the tread portion 2 is laid out to be flat. The first tread end T1 and the second tread end T2 can each correspond to the end edges, on the outer side in the tire axial direction, of blocks included in a block row located on the outermost side in the tire axial direction, among blocks disposed in the tread portion 2. In FIG. 2, the first tread end T1 is shown as a tread end on the left side and the second tread end T2 is shown as a tread end on the right side, but embodiments of the present disclosure are not limited thereto.

The tread portion 2 can include a base surface 4, and a plurality of blocks 5 raised outward in the tire radial direction from the base surface 4. A tread surface, facing outward in the tire radial direction, of each block 5 can extend parallel to the base surface 4. The blocks 5 of one or more embodiments of the present disclosure can include a plurality of crown blocks 6 on the tire equator C side, a plurality of shoulder blocks 8 on the first tread end T1 or the second tread end T2 side, and a plurality of middle blocks 7 disposed between the crown blocks 6 and the shoulder blocks 8. In each crown block 6, the centroid of the tread surface thereof (meaning a surface that comes into contact with a flat surface when the tire is made to run thereon, the same applies below) on the outer side in the tire radial direction can be located within the crown region Cr. In each middle block 7, the centroid of the tread surface thereof can be located within the middle region Mi. In each shoulder block 8, the centroid of the tread surface thereof can be located within the shoulder region Sh. When the tread surface is provided with grooves, the centroid can mean the centroid of the tread surface in a state where all the grooves are filled.

The tread portion 2 of one or more embodiments of the present disclosure can include a plurality of first blocks 11 disposed on the first tread end T1 side with respect to the tire equator C. The first blocks 11 according to one or more embodiments of the disclosure subject matter can be regarded as the middle blocks 7 disposed in the middle region Mi, but the first blocks 11 may additionally or alternatively be disposed in the shoulder region Sh.

The first blocks 11 according to one or more embodiments of the present disclosure can include a plurality of first inner blocks 11A disposed relatively on the tire equator C side, and a plurality of first outer blocks 11B disposed on the first tread end T1 side with respect to the first inner blocks 11A. Whereas the entire first inner blocks 11A can be disposed in the middle region Mi, the first outer blocks 11B can each be so as to be located in both the middle region Mi and the shoulder region Sh. According to one or more embodiments, the first inner blocks 11A and the first outer blocks 11B can alternate in a tire circumferential direction. However, embodiments of the present disclosure are not limited thereto. Hereinafter, as the configuration of each first block 11, the configuration of the first inner block 11A will be described as an example.

Figure 3:
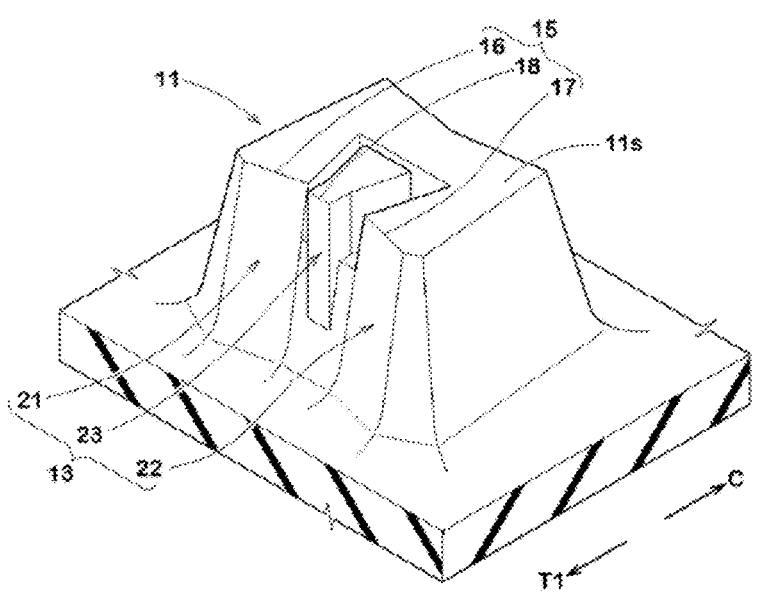
FIG. 3 is an enlarged perspective view of a first block in FIG. 2.
Figure 4:
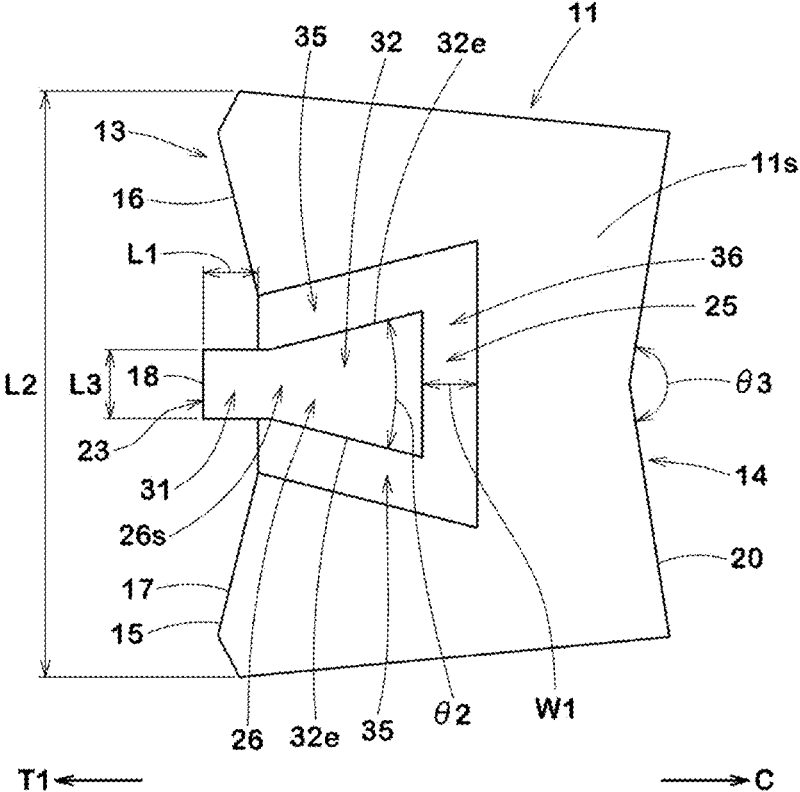
FIG. 4 is an enlarged plan view of the first block in FIG. 2.

FIG. 3 shows an enlarged perspective view of the first block 11, and FIG. 4 shows an enlarged plan view of the first block 11. According to one or more embodiments of the present disclosure, an enlarged plan view of the tread surface of the block as shown in FIG. 4 illustrates the contour of the tread surface of the block. However, the configurations of side surfaces or the root of the block may be omitted, even if the configuration thereof can be observed in a plan view of the block.

As shown in FIG. 3 and FIG. 4, the plurality of first blocks 11 can each include a tread surface 11s facing outward in the tire radial direction, and an outer side wall 13 on the first tread end T1 side. The tread surface 11s can include an outer edge 15 between the tread surface 11s and the outer side wall 13. The outer edge 15 can correspond to a ridgeline formed between the tread surface 11s and the outer side wall 13. In the case where the tread surface 11s and the outer side wall 13 are connected so as to form a minute curved surface, the outer edge 15 can correspond to a set of the center positions of arcs observed in cross-sections of the curved surface.

As shown in FIG. 3, the outer edge 15 can include a protrusion 18, a first portion 16, and a second portion 17. The protrusion 18 can protrude locally on the first tread end T1 side. The first portion 16 can be located on one side in the tire circumferential direction of the protrusion 18. The second portion 17 can be located on the other side in the tire circumferential direction of the protrusion 18.

As shown in FIG. 4, the first portion 16 and the second portion 17 can be disposed so as to form a minor angle therebetween on the first tread end T1 side. That is, of a conjugate angle on the tire equator C side and a conjugate angle on the first tread end T1 side that are formed by the first portion 16 and the second portion 17, the conjugate angle on the first tread end T1 side can be an angle smaller than 180°. As a result of adopting the above configuration, the tire 1 according to one or more embodiments of the present disclosure can achieve suitable (e.g., excellent) rolling characteristics.

The rolling characteristics may be regarded as overall impression that a driver can feel when rolling a vehicle during cornering. Accordingly, the rolling characteristics can include at least one or more of lightness during rolling, response during rolling, and the like. The lightness during rolling can be regarded as characteristics that the vehicle can be rolled with smaller force. The response during rolling can be regarded as characteristics that the driver receives moderate reaction force from the vehicle during rolling and the reaction force is linear. "Excellent rolling characteristics" can be regarded as that these characteristics are exhibited in a well-balanced manner, so that a suitable (e.g., an excellent) result can be expected in motocross racing or the like.

One reason, among one or more reasons, why the tire 1 according to one or more embodiments of the present disclosure can achieve excellent rolling characteristics can be as follows. According to one or more embodiments of the present disclosure, the tread surface 11s of the first block 11 can include the protrusion 18, whereby deformation of the first block 11 (deformation caused when the block falls down excessively on the first tread end side) of the first block 11 can be inhibited during rolling. Accordingly, the driver can receive sufficient response during rolling. In addition, in the tire 1 according to one or more embodiments of the present disclosure, the first portion 16 and the second portion 17 of the outer edge 15 can be disposed so as to form a minor angle therebetween on the first tread end T1 side. Accordingly, when the outer edge 15 comes into contact with the ground during cornering, the outer edge 15 and the outer side wall 13 can be moderately deformed such that the minor angle becomes larger. Such an effect can serve to enhance lightness during rolling, and, in cooperation with the above-described effect of the protrusion 18, suitable (e.g., excellent) rolling characteristics can be achieved.

Hereinafter, more detailed configurations of one or more embodiments of the present disclosure will be described. The configurations described below show a specific mode of one or more embodiments of the present disclosure. Therefore, it is needless to say that one or more embodiments of the present invention can achieve the above-described effect even when the configurations described below are not implemented. In addition, even when any one of the configurations described below is independently applied to the tire according to one or more embodiments of the present disclosure having the above-described characteristics, performance improvement corresponding to each configuration can be expected. Furthermore, some or all of the configurations described below can be applied in combination, to implement relatively complex performance improvement.

As shown in FIG. 3, the first portion 16, the second portion 17, and the protrusion 18 each can linearly extend. The outer side wall 13 according to one or more embodiments of the present disclosure can include a first side wall portion 21, a second side wall portion 22, and a protruding side wall 23 that each can be planar and can be respectively connected to the first portion 16, the second portion 17, and the protrusion 18. The first side wall portion 21 can extend from the first portion 16 toward the root of the first block 11. The second side wall portion 22 can extend from the second portion 17 toward the above-mentioned root. The protruding side wall 23 can extend from the protrusion 18 toward the root of the first block 11. The outer side wall 13 according to one or more embodiments of the present disclosure can have a shape that is recessed on the tire equator C side and which can be formed by the first side wall portion 21 and the second side wall portion 22. In addition, the protruding side wall 23 can protrude locally from the bottom portion of the outer side wall 13.

As shown in FIG. 4, for instance, the tread surface 11s of the first block 11 according to one or more embodiments of the present disclosure can be provided with one narrow groove 25. According to one or more embodiments, only one narrow groove 25 can be provided. The narrow groove 25 can have a semi-annular shape with both ends opened at the outer side wall 13. Optionally, the first block 11 can include a protruding block piece 26 surrounded (e.g., fully or partially) by the narrow groove 25. According to one or more embodiments of the present disclosure, the protruding block piece 26 can include the protrusion 18. However, one or more embodiments of the present disclosure are not limited thereto. Even if the narrow groove 25 and the protruding block piece 26 are not formed, the above-described effect can be expected, for instance, as long as the tread surface 11s includes the above-described first portion 16, second portion 17, and protrusion 18.

In a planar view of the tread surface 11s, the protrusion 18 can protrude outward in a block width direction, for instance, by 1 mm or more from the first portion 16 and the second portion 17. That is, a distance L1 in the tire axial direction from the end on the protrusion 18 side of the first portion 16 or the second portion 17 to the end on the first tread end T1 side of the protrusion 18 can be 1 mm or more. According to one or more embodiments, the distance L1 can be 1.0 to 3.0 mm, as an example. Such a configuration can facilitate moderate deformation of the part around the protrusion 18, and mud and dirt attached around the first block 11 can be effectively removed during running on a muddy road, for example.

A maximum length L3 in the tire circumferential direction of the protruding side wall 23 can be, for example, 5% to 75% of a maximum length L2 in the tire circumferential direction of the tread surface 11s of the first block 11. According to one or more embodiments, the length L3 of the protruding side wall 23 can be 5% to 25% of the length L2 of the tread surface 11s of the first block 11, for instance, 5% to 15% thereof. Accordingly, the protruding block piece 26 can have appropriate stiffness to exert suitable (e.g., great) reaction force in the tire circumferential direction, so that traction performance can be improved.

As shown in FIG. 2, an angle θ1 which can be regarded as the minor angle between the first portion 16 and the second portion 17 can be, for example, 140 to 160°. Accordingly, the above-described effect can be reliably achieved.

Figure 5:
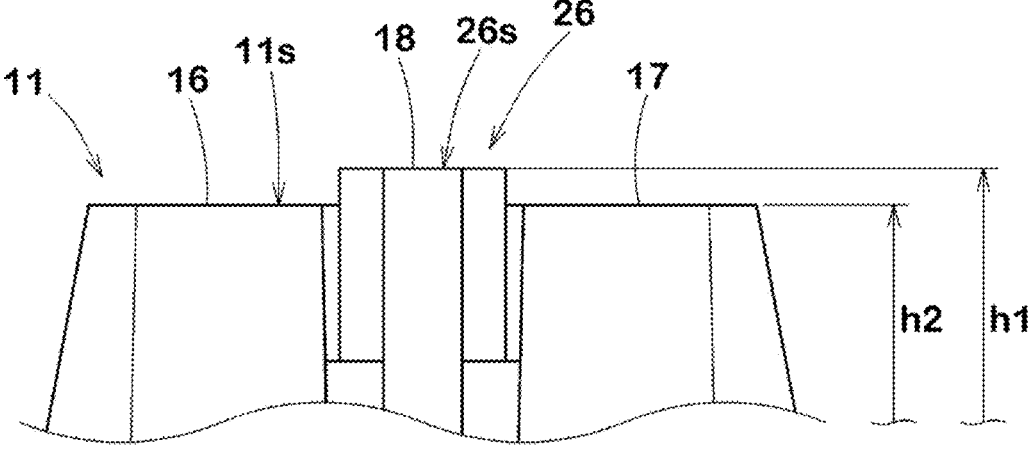
FIG. 5 is an enlarged side view illustrating a first portion, a second portion, and a protrusion of the first block.

FIG. 5 is an enlarged side view (side view observed in the direction of an arrow B in FIG. 2) of the first block 11 illustrating the first portion 16, the second portion 17, and the protrusion 18. As shown in FIG. 5, the protrusion 18 can include a portion that is more protruded in the height direction of the first block 11 than the first portion 16 and second portion 17. According to one or more embodiments, the entire protrusion 18 can be more protruded in the height direction than the first portion 16 and/or the second portion 17. Optionally, the entire tread surface 26s of the protruding block piece 26 can be more protruded in the height direction than the other parts of the first block 11. Such as the first portion 16 and/or the second portion 17. A maximum height h1 measured at the protrusion 18 of the first block 11 can be, for instance, 102% to 120% of a maximum height h2 measured at the first portion 16 and/or the second portion 17 of the first block 11. According to one or more embodiments of the present disclosure, the relationship between the height of the protrusion 18 and the height of the first portion 16 and/or the second portion 17 can be applied to the relationship between the height of the protruding block piece 26 measured at the tread surface 26s and the height of the first block 11 measured at the tread surface 11s, for instance, except for the tread surface 26s. With such a first block 11, rolling characteristics can be improved, great grip force can be exerted by the protruding block piece 26, and traction performance and cornering performance can also be improved.

As shown in FIG. 4, the tread surface 26s of the protruding block piece 26 can include a constant width portion 31 that extends toward the tire equator C side so as to have a width, for instance, equal to the length of the protrusion 18, and a widening portion 32 of which a width in the tire circumferential direction that can increase toward the tire equator C side. According to one or more embodiments, in a planar view of the tread surface 11s of the first block 11, the widening portion 32 can be surrounded (e.g., partially, largely, or completely) by the narrow groove 25. Also, in the planar view, a portion (e.g., some, most, or all) of the constant width portion 31 (e.g., most, such as 80% or more of the area of the constant width portion 31) can be located on the first tread end T1 side with respect to a virtual line obtained by connecting the end on the protrusion 18 side of the first portion 16 and the end on the protrusion 18 side of the second portion 17. The protruding block piece 26 having such a tread surface 26s can allow the edge of the constant width portion 31 to provide a grip force in the tire circumferential direction, which can enhance the traction performance.

According to one or more embodiments, the area of the widening portion 32 can be larger than that of the constant width portion 31. The area of the widening portion 32 can be, for example, 3.0 to 4.0 times that of the constant width portion 31. Accordingly, damage to the protruding block piece 26 can be effectively reduced.

The widening portion 32 can include two edges 32e that linearly extend. The two edges 32e can extend non-parallel to each other, according to one or more embodiments of the disclosed subject matter. An angle θ2 between the two edges 32e can be, for example, 20 to 40°, such as 25 to 35°. Such a widening portion 32 can prevent excessive falling of the protruding block piece 26 on the first tread end T1 side and can improve response during rolling.

The narrow groove 25 can include two lateral groove portions 35 and one longitudinal groove portion 36. Each of the two lateral groove portions 35 can extend from the outer side wall 13 toward the tire equator C side. The longitudinal groove portion 36 can extend from an end portion on the tire equator C side of one lateral groove portion 35 to an end portion on the tire equator C side of the other lateral groove portion 35. In addition, the lateral groove portions 35 and/or the longitudinal groove portion 36 can linearly extend. Each lateral groove portion 35 and the longitudinal groove portion 36 can be connected so as to form acute angles therebetween.

The two lateral groove portions 35 can extend so as to be inclined in a direction away from each other toward the tire equator C side. An angle between the two lateral groove portions 35 can be the same or substantially the same as the angle θ2 between the two edges 32e of the widening portion 32.

The longitudinal groove portion 36 can be disposed at a center portion of the first block 11. From this viewpoint, according to one or more embodiments of the present disclosure, in a case where, in a state where the narrow groove 25 is filled, the first block 11 can be divided into three regions, for instance, having equal areas by two virtual straight lines extending parallel with the tire circumferential direction, at least a part of the longitudinal groove portion 36 of the tread surface 11s is positioned at a center region of the three regions. According to one or more embodiments, the entire longitudinal groove portion 36 can be positioned at the center region of the three regions. Such positioning of the longitudinal groove portion 36 can serve to inhibit uneven wear of the first block 11.

A maximum groove width W1 of the narrow groove 25 can be, for instance, 70% to 90% of the maximum length L3 in the tire circumferential direction of the protruding side wall 23. Such a narrow groove 25 can inhibit uneven wear of the block and can serve to enhance grip performance on a muddy road.

The first block 11 can include an inner side wall 14 on the tire equator C side. According to one or more embodiments, the inner side wall 14 can be recessed toward the first tread end T1 side. Specifically, the tread surface 11s can include an inner edge 20 between the tread surface 11s and the inner side wall 14, and the inner edge 20 can be composed of two linear edges disposed so as to form a minor angle therebetween on the tire equator C side. In addition, the inner side wall 14 can include two flat surfaces extending from the two straight-line edges to the root of the first block 11. Such an inner side wall 14 can provide suitable (e.g., great) reaction force in the tire axial direction, particularly during cornering on a muddy road, thereby enhancing cornering performance.

According to one or more embodiments, an angle θ3 which is the minor angle formed by the inner edge 20 can be larger than the angle θ1 (e.g., as shown in FIG. 2) which is the minor angle between the first portion 16 and the second portion 17 of the outer edge 15. For example, the angle θ3 which is the minor angle can be 150 to 170°. Accordingly, the change in the response during rolling can become linear, which can further improve rolling characteristics.

Figure 6:
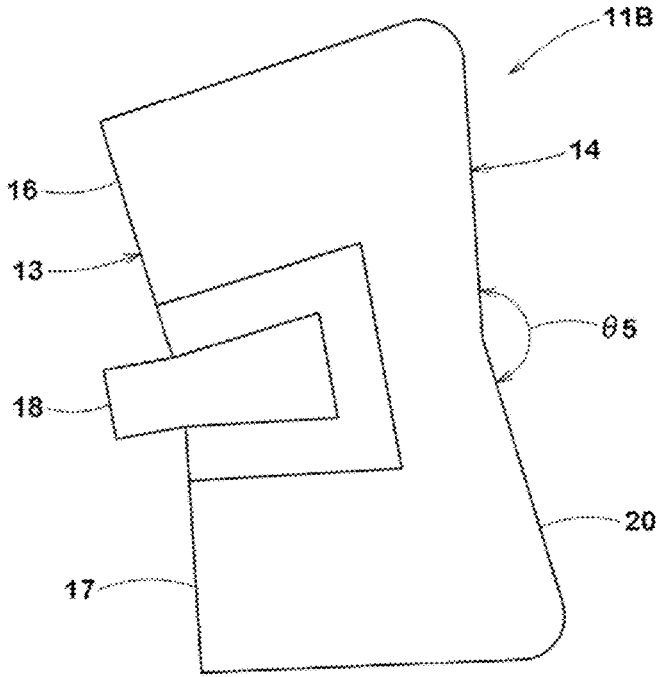
FIG. 6 is an enlarged plan view of a first outer block in FIG. 2.

FIG. 6 is an enlarged plan view of the first outer block 11B. The above-described characteristics of the first block 11 (first inner block 11A) can be applied to the first outer block 11B as shown in FIG. 6.

The first outer block 11B can be formed as a longitudinally elongated shape in the tire circumferential direction, as compared to the first inner block 11A. Accordingly, as for an aspect ratio obtained by dividing the maximum length in the tire circumferential direction of the tread surface 11s by the maximum length in the tire axial direction of the tread surface 11s, the aspect ratio of the first outer block 11B can be larger than the aspect ratio of the first inner block 11A. Specifically, while the aspect ratio of the first inner block 11A can be 1.25 to 1.40, for instance, the aspect ratio of the first outer block 11B can be 1.40 to 1.50, for instance. Accordingly, the first outer block 11B can provide suitable (e.g., great) reaction force in the tire axial direction, thereby improving cornering performance.

As shown in FIG. 2, an angle θ4 which is a minor angle between the first portion 16 and the second portion 17 of the outer edge 15 of the first outer block 11B can be larger than the angle θ1 of the first inner block 11A. For instance, the angle θ4 can be 165 to 170°, and the difference between the angle θ4 and the angle θ1 can be 10 to 25°. Accordingly, suitable (e.g., excellent) rolling characteristics can be achieved in various road surface conditions.

From the same viewpoint, an angle θ5 which is a minor angle formed by an inner edge 20 of the first outer block 11B as shown in FIG. 6 can be larger than the angle θ3 (shown in FIG. 4) which is the minor angle formed by the inner edge 20 of the first inner block 11A. For instance, the angle θ5 can be 165 to 175°, and the difference between the angle θ3 and the angle θ5 can be 5 to 10°.

As shown in FIG. 2, in the crown region Cr, the plurality of crown blocks 6 can be provided, for example. According to one or more embodiments of the present disclosure, first crown blocks 6A and second crown blocks 6B can have shapes different from each other alternate in the tire circumferential direction.

The first crown blocks 6A each can have a substantially rectangular tread surface, and no groove may be provided to the tread surface. The second crown blocks 6B can each include two block pieces 41 and a tie bar 42 connecting the block pieces 41. However, the crown blocks 6 are not limited thereto.

In a planar view of the tread portion 2, a virtual region 43 obtained by extending the first inner block 11A in a direction parallel with the tire axial direction toward the tire equator C side can be overlapped with at least a part of the first crown block 6A. Additionally or alternatively, a virtual region 44 obtained by extending the first outer block 11B parallel with the tire axial direction toward the tire equator C side can be overlapped with at least a part of the second crown block 6B. In such an arrangement of blocks, the crown blocks 6 and the first blocks 11 can cooperate to provide great reaction force in the tire circumferential direction during running on a muddy road, which can serve to improve traction performance.

In each shoulder region Sh, a plurality of shoulder blocks 8 can be provided. According to one or more embodiments of the present disclosure, in a planar view of the tread portion 2, none of the virtual regions 45 obtained by extending the first blocks 11 (including both the first inner block 11A and the first outer block 11B) parallel with the tire axial direction toward the first tread end T1 side may be overlapped with the shoulder block 8. In such an arrangement of blocks, dirt and mud may be less likely to be retained between the first blocks 11 and the shoulder blocks 8, which can lead to continuously achieving suitable (e.g., excellent) rolling characteristics.

The tread portion 2 according to one or more embodiments of the present disclosure can include a plurality of second blocks 12 disposed on the second tread end T2 side with respect to the tire equator C. The second blocks 12 can have the same or substantially the same characteristics as the above-described first blocks 11.

Although the preferable modes of the motorcycle tire for running on rough terrain according to embodiments of the present disclosure have been described in detail above, embodiments of the present disclosure are not limited to the above-described specific embodiment, and various modifications can be made to implement one or more embodiments of the disclosed subject matter.

EXAMPLES

Figure 7:
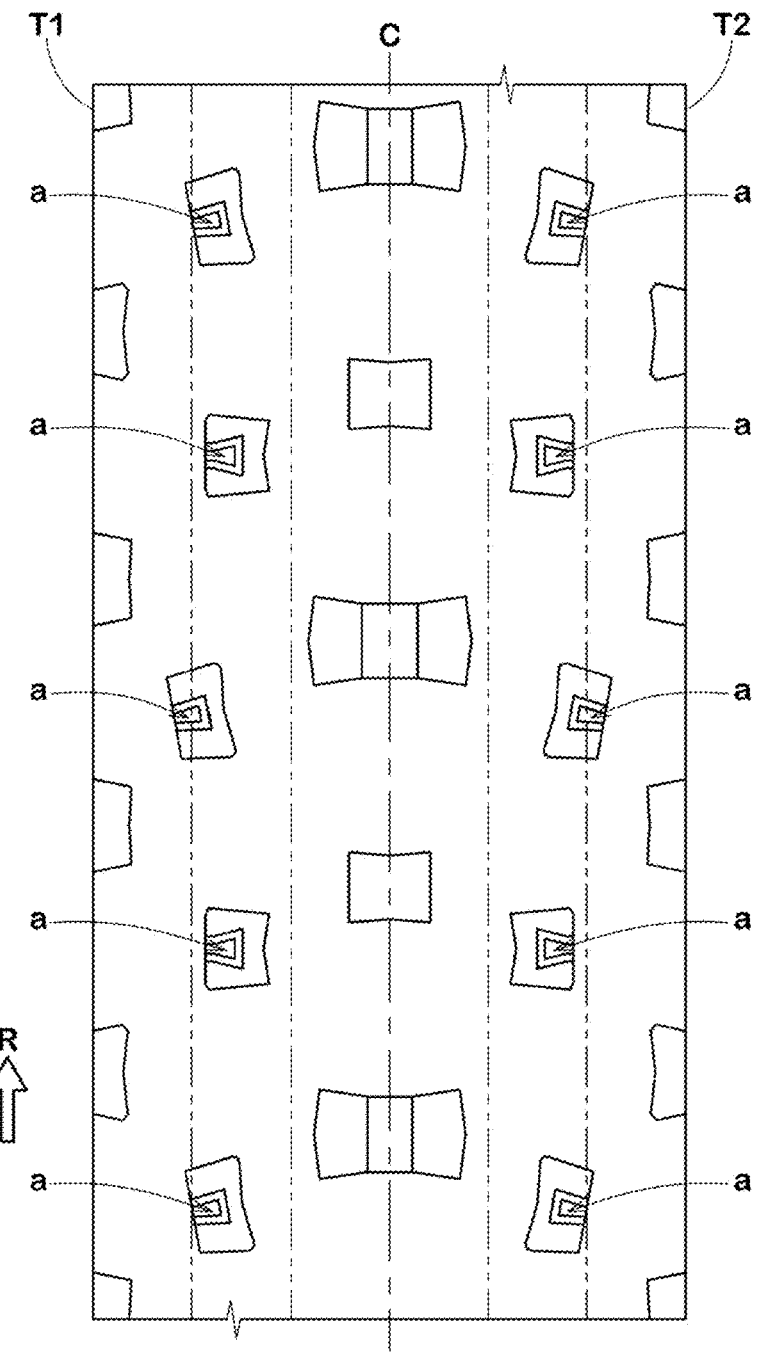
FIG. 7 is a development of a tread portion of a tire of a comparative example.

A rear wheel tire for a motorcycle for running on rough terrain having the basic pattern in FIG. 2 was produced as a test tire. As a comparative example, a tire having a tread pattern shown in FIG. 7 was produced as a test tire. As shown in FIG. 7, the tire of the comparative example is based on the tread pattern shown in FIG. 2, but, instead of the first blocks and the second blocks, blocks a which do not have the characteristics of the present invention are disposed. The tire of the comparative example is substantially the same as the tire of the example, except for the above matters. For these test tires, rolling characteristics were tested. The specifications common to the test tires and the test method are as follows.

Used vehicle: motocross racing vehicle with an engine
    displacement of 450 cc
  Tire size: 120/80-19
  Rim size: 2.15 WM
  Internal pressure: 80 kPa
  The test method is as follows.
<Rolling Characteristics>

Sensory evaluation for rolling characteristics was made by a test rider when the test rider drove the above-described test vehicle on a motocross course. The rolling characteristics represent the total score of rolling lightness and response during rolling, and these items were evaluated in a five-point method. The greater the value is, the better the characteristics of each item are.

The results of the test are indicated in Table 1.

TABLE 1

| | Comparative Example | Example |
|---|---|---|
| Drawing showing tread pattern | FIG. 7 | FIG. 2 |

TABLE 1-continued

| | Comparative Example | Example |
|---|---|---|
| Rolling lightness (score) | 3.50 | 3.70 |
| Response during rolling (score) | 3.50 | 3.95 |
| Rolling characteristics (total score of above two items) | 7.00 | 7.65 |

As shown in Table 1, it is confirmed that the tire of the example can achieve suitable (e.g., excellent) rolling characteristics.

[Additional Note]

One or more embodiments of the present disclosure can include some or all of the following aspects.

[1]

A motorcycle tire for running on rough terrain, the motorcycle tire including a tread portion, wherein the tread portion includes a tire equator, a first tread end, and a plurality of first blocks disposed on the first tread end side with respect to the tire equator, each of the plurality of first blocks includes a tread surface facing outward in a tire radial direction and an outer side wall on the first tread end side, the tread surface includes an outer edge between the tread surface and the outer side wall, the outer edge includes a protrusion protruding locally on the first tread end side, a first portion located on one side in a tire circumferential direction of the protrusion, and a second portion located on another side in the tire circumferential direction of the protrusion, and the first portion and the second portion are disposed so as to form a minor angle therebetween on the first tread end side.

[2]

The motorcycle tire for running on rough terrain according to [1], wherein in a planar view of the tread surface, the protrusion protrudes outward in a block width direction by 1 mm or more from the first portion and the second portion.

[3]

The motorcycle tire for running on rough terrain according to [1] or [2], wherein the outer side wall includes a protruding side wall extending from the protrusion toward a root of the first block, and a maximum length in the tire circumferential direction of the protruding side wall is 5% to 75% of a maximum length in the tire circumferential direction of the tread surface of the first block.

[4]

The motorcycle tire for running on rough terrain according to any one of [1] to [3], wherein the protrusion includes a portion that is more protruded in a height direction of the first block than the first portion and second portion.

[5]

The motorcycle tire for running on rough terrain according to any one of [1] to [4], wherein a maximum height measured at the protrusion of the first block is 102% to 120% of a maximum height measured at the first portion or the second portion of the first block.

[6]

The motorcycle tire for running on rough terrain according to any one of [1] to [5], wherein the tread surface is provided with one narrow groove, the narrow groove has a semi-annular shape with both ends opened at the outer side wall, and the first block includes the protrusion, and a protruding block piece surrounded by the narrow groove.

[7]

The motorcycle tire for running on rough terrain according to any one of [1] to [6], wherein the first block includes an inner side wall on the tire equator side, and the inner side wall is recessed toward the first tread end side.

[8]

The motorcycle tire for running on rough terrain according to any one of [1] to [7], wherein the minor angle is less than 180 degrees.

[9]

The motorcycle tire for running on rough terrain according to any one of [1] to [8], wherein a narrow groove, a first lateral groove, and a second lateral groove extend into each of the first blocks in the tire radial direction, the narrow groove, the first lateral groove, and the second lateral groove collectively surround a portion of a protruding block piece integral with the protrusion, the protruding block piece includes a constant width portion that extends toward the tire equator and a widening portion in which a width thereof in the tire circumferential direction increases toward a tire equator side, and in a plan view of the tread portion, a width of the constant width portion is less than a maximum width of the widening portion.

[10]

The motorcycle tire for running on rough terrain according to any one of [1] to [9], wherein in a plan view of the tread portion, no portion of the widening portion of the protruding block piece extends from the first and second lateral grooves.

[11]

The motorcycle tire for running on rough terrain according to any one of [1] to [10], wherein a maximum groove width of the narrow groove is 70% to 90% of a maximum length in the tire circumferential direction of a protruding side wall forming the protrusion.

[12]

The motorcycle tire for running on rough terrain according to any one of [1] to [11], wherein in a plan view of the tread portion, for at least some of the first blocks, the protrusion extends at a non-parallel and non-perpendicular angle with respect to the tire circumferential direction.

[13]

The motorcycle tire for running on rough terrain according to any one of [1] to [12], wherein an inner side wall of each of the first blocks opposite the protrusion forms an obtuse angle in a plan view of the tread portion.

[14]

The motorcycle tire for running on rough terrain according to any one of [1] to [13], wherein in a plan view of the tread portion, each of the first blocks has a width that increases from an inner side wall opposite the protrusion going toward the first tread end side.

[15]

A tread for a motorcycle tire, wherein the tread includes a tire equator, a first tread end, and a plurality of first blocks on a first tread end side with respect to the tire equator, each of the plurality of first blocks includes a tread surface facing outward in a tire radial direction and an outer side wall on the first tread end side, the tread surface includes an outer edge between the tread surface and the outer side wall, the outer edge includes a protrusion protruding locally on the first tread end side, a first portion on a first side in a tire circumferential direction of the protrusion, and a second portion on a second side in the tire circumferential direction of the protrusion opposite the first side, the first portion and the second portion are disposed so as to form a minor angle therebetween on the first tread end side, a narrow groove, a first lateral groove, and a second lateral groove extend into each of the first blocks in the tire radial direction, the narrow groove, the first lateral groove, and the second lateral groove collectively surround a portion of a protruding block piece integral with the protrusion, the protruding block piece includes a constant width portion that extends toward the tire equator and a widening portion in which a width thereof in the tire circumferential direction increases toward a tire equator side, in a plan view of the tread, a width of the constant width portion is less than a maximum width of the widening portion, in the plan view of the tread, no portion of the widening portion of the protruding block piece extends from the first and second lateral grooves, a maximum groove width of the narrow groove is 70% to 90% of a maximum length in the tire circumferential direction of a protruding side wall forming the protrusion, and wherein in a side view of the each of the first blocks, the protrusion protrudes outward in a block width direction more than each of the first portion and the second portion.

[16]

The tread for the motorcycle tire according to [15], wherein the minor angle is less than 180 degrees, and an inner side wall of each of the first blocks opposite the protrusion forms an obtuse angle in a plan view of the tread portion.

[17]

The tread for the motorcycle tire according to [15] or [16], wherein in a plan view of the tread portion, no portion of the widening portion of the protruding block piece extends from the first and second lateral grooves, in the plan view of the tread portion, each of the first blocks has a width that increases from an inner side wall opposite the protrusion going toward the first tread end side.

[18]

The tread for the motorcycle tire according to any one of [15] to [17], wherein in a plan view of the tread portion, for at least some of the first blocks, the protrusion extends at a non-parallel and non-perpendicular angle with respect to the tire circumferential direction.

What is claimed is:

1. A motorcycle tire for running on rough terrain, the motorcycle tire comprising a tread portion, wherein the tread portion includes a tire equator, a first tread end, and a plurality of first blocks on a first tread end side with respect to the tire equator, each of the plurality of first blocks includes:

a tread surface facing outward in a tire radial direction, and an outer side wall on the first tread end side, the tread surface of each of the first blocks includes an outer edge between the tread surface and the outer side wall, the outer edge of the tread surface includes:

a protrusion protruding locally on the first tread end side, a first portion on a first side in a tire circumferential direction of the protrusion, and a second portion on a second side in the tire circumferential direction of the protrusion opposite the first side, in a plan view of the tread portion the first portion and the second portion of the outer edge of the tread surface are disposed so as to form a minor angle therebetween on the first tread end side as measured axially outward from the outer edges of the first and second portions, away from the first block, the minor angle is from 140 degrees to 160 degrees, the first block includes a protruding block piece forming the protrusion and the first and second portions of the outer edge of the tread surface, the protruding block piece of each of the first blocks includes in the plan view of the tread portion:

a constant width portion, and a widening portion in which a width thereof increases, each of the first blocks, in the plan view of the tread, define a first pair of edges separated by the constant width portion, and a second pair of edges opposite the first pair of edges, and in the plan view of the tread portion, the edges of the first pair face inward toward a longitudinal axis that extends lengthwise through the protruding block piece to define the minor angle between the edges of the first pair.

2. The motorcycle tire for running on rough terrain according to claim 1, wherein in a planar view of the tread surface, the protrusion protrudes outward in a block width direction by 1 mm or more from the first portion and the second portion.

3. The motorcycle tire for running on rough terrain according to claim 1, wherein the outer side wall includes a protruding side wall extending from the protrusion toward a root of the first block, and a maximum length in the tire circumferential direction of the protruding side wall is 5% to 75% of a maximum length in the tire circumferential direction of the tread surface of the first block.

4. The motorcycle tire for running on rough terrain according to claim 1, wherein the protrusion includes a portion that is more protruded in a height direction of the first block than the first portion and second portion.

5. The motorcycle tire for running on rough terrain according to claim 4, wherein a maximum height measured at the protrusion of the first block is 102% to 120% of a maximum height measured at the first portion or the second portion of the first block.

6. The motorcycle tire for running on rough terrain according to claim 1, wherein the tread surface has one narrow groove, and the narrow groove has a semi-annular shape with both ends opened at the outer side wall.

7. The motorcycle tire for running on rough terrain according to claim 1, wherein the first block includes a second side wall on the tire equator side, and the second side wall is recessed toward the first tread end side.

8. The motorcycle tire for running on rough terrain according to claim 1, wherein in the plan view of the tread portion some but not all of the first blocks are rotatably offset with respect to both the tire circumferential direction and a tire width direction perpendicular to the tire circumferential direction, and the rotational offset in the plan view of said at least some of the first blocks is less than 180 degrees.

9. The motorcycle tire for running on rough terrain according to claim 8, wherein at least one set of said at least some of the first blocks that are rotatably offset with respect to both the tire circumferential direction and the tire width direction in the plan view of the tread portion, alternate in the tire circumferential direction with ones of the first blocks not being offset with respect to both the tire circumferential direction and the tire width direction.

10. The motorcycle tire for running on rough terrain according to claim 1, wherein a narrow groove, a first lateral groove, and a second lateral groove extend into each of the first blocks in the tire radial direction, the narrow groove, the first lateral groove, and the second lateral groove collectively surround a portion of the protruding block piece which is integral with the protrusion, the constant width portion extends toward the tire equator, and the widening portion has a width thereof in the tire circumferential direction increases toward a tire equator side, and in the plan view of the tread portion, a width of the constant width portion is less than a maximum width of the widening portion.

11. The motorcycle tire for running on rough terrain according to claim 10, wherein in the plan view of the tread portion, no portion of the widening portion of the protruding block piece extends from the first and second lateral grooves.

12. The motorcycle tire for running on rough terrain according to claim 10, wherein a maximum groove width of the narrow groove is 70% to 90% of a maximum length in the tire circumferential direction of a protruding side wall forming the protrusion.

13. The motorcycle tire for running on rough terrain according to claim 1, wherein in the plan view of the tread portion, for at least some of the first blocks, the protruding block piece of the protrusion has a length greater than a width thereof, the length extending at a non-parallel and non-perpendicular angle with respect to the tire circumferential direction.

14. The motorcycle tire for running on rough terrain according to claim 1, wherein an inner side wall of each of the first blocks opposite the protrusion forms an obtuse angle in the plan view of the tread portion.

15. The motorcycle tire for running on rough terrain according to claim 1, wherein in the plan view of the tread portion, each of the first blocks has a width that increases from an inner side wall opposite the protrusion going toward the first tread end side.

16. The motorcycle tire for running on rough terrain according to claim 1, wherein in the plan view of the tread portion, the edges of the second pair face inward toward the longitudinal axis that extend lengthwise through the protruding block piece to define a combined angle between the edges of the second pair.

17. The motorcycle tire for running on rough terrain according to claim 16, wherein the combined angle is greater than the minor angle.

18. The motorcycle tire for running on rough terrain according to claim 17, wherein the combined angle is 150 degrees to 170 degrees.

19. A tread for a motorcycle tire, wherein the tread includes a tire equator, a first tread end, and a plurality of first blocks on a first tread end side with respect to the tire equator, and, in a plan view of the tread, a crown region extending in a tire circumferential direction and overlapping the tire equator, a middle region extending in the tire circumferential direction and being adjacent to the crown region on the first tread end side, a shoulder region extending in the tire circumferential direction and being adjacent to the middle region and extending in a tire axial direction from the middle region to the first tread end, and no portion of any of the first blocks is in the crown region, each of the plurality of first blocks includes:
a tread surface facing outward in a tire radial direction, and
an outer side wall on the first tread end side,
the tread surface of each of the first blocks includes an outer edge between the tread surface and the outer side wall,
the outer edge of the tread surface includes:
a protrusion protruding locally on the first tread end side,
a first portion on a first side in the tire circumferential direction of the protrusion, and
a second portion on a second side in the tire circumferential direction of the protrusion opposite the first side, and
in the plan view of the tread the first portion and the second portion of the outer edge of the tread surface are disposed so as to form a minor angle therebetween on the first tread end side as measured axially outward from the outer edges of the first and second portions, away from the first block, the minor angle being from 140 degrees to 160 degrees,
a narrow groove, a first lateral groove, and a second lateral groove extend into each of the first blocks in the tire radial direction,
the narrow groove, the first lateral groove, and the second lateral groove collectively surround a portion of a protruding block piece integral with the protrusion, the protruding block piece includes:
a constant width portion that extends toward the tire equator, and
a widening portion in which a width thereof in the tire circumferential direction increases toward a tire equator side,
in the plan view of the tread, a width of the constant width portion is less than a maximum width of the widening portion,
in the plan view of the tread, no portion of the widening portion of the protruding block piece extends from the first and second lateral grooves,
a maximum groove width of the narrow groove is 70% to 90% of a maximum length in the tire circumferential direction of a protruding side wall forming the protrusion,
in a side view of the each of the first blocks, the protrusion protrudes outward in a block width direction more than each of the first portion and the second portion,
for each of the first blocks the widening portion of the protruding block piece is closer to the tire equator compared to the constant width portion of the protruding block piece,
in the plan view of the tread, the outer side wall for each of the first blocks faces toward the first tread end,
in the plan view of the tread, at least some of the first blocks extend into both the shoulder region and the middle region,
in the plan view of the tread, some but not all of the first blocks directly face in the tire axial direction toward the first tread end,
the first block includes a protruding block piece forming the protrusion and the first and second portions of the outer edge of the tread surface,
each of the first blocks, in the plan view of the tread, define a first pair of edges separated by the protrusion of the outer edge of the tread surface, and a second pair of edges opposite the first pair of edges, and
in the plan view of the tread portion, the edges of the first pair face inward toward a longitudinal axis that extends lengthwise through the protruding block piece to define the minor angle between the edges of the first pair.

20. The motorcycle tire for running on rough terrain according to claim 19, wherein
the tread includes:
a plurality of shoulder blocks in the shoulder region and running in the tire circumferential direction, and
a plurality of crown blocks in the crown region and running in the tire circumferential direction, and
neither any of the crown blocks nor any of the shoulder blocks has the protruding block piece integral with the protrusion.

21. The tread for the motorcycle tire according to claim 19, wherein an inner side wall of each of the first blocks opposite the protrusion forms an obtuse angle in the plan view of the tread.

22. The tread for the motorcycle tire according to claim 19, wherein
in the plan view of the tread, no portion of the widening portion of the protruding block piece extends from the first and second lateral grooves, and
in the plan view of the tread, each of the first blocks has a width that increases from an inner side wall opposite the protrusion going toward the first tread end side.

23. The tread for the motorcycle tire according to claim 19, wherein in the plan view of the tread, for at least some of the first blocks, the protruding block piece of the protrusion has a length greater than a width thereof, the length extending at a non-parallel and non-perpendicular angle with respect to the tire circumferential direction.

* * * * *